United States Patent [19]

Paar

[11] Patent Number: 4,837,291

[45] Date of Patent: Jun. 6, 1989

[54] SELF-CROSSLINKING CATIONIC PAINT BINDERS FROM AMINE MODIFIED EPOXY RESINS REACTED WITH (1) PARTIALLY BLOCKED ISOCYANATE AND (2) FORMALDEHYDE

[75] Inventor: Willibald Paar, Graz, Austria

[73] Assignee: Vianova Kunstharz, A.G., Werndorf, Austria

[21] Appl. No.: 63,998

[22] Filed: Jun. 19, 1987

[30] Foreign Application Priority Data

Jun. 19, 1986 [AT] Austria .................. 1665/86

[51] Int. Cl.$^4$ .................. C08G 18/32; C08G 18/58
[52] U.S. Cl. .................. 528/45; 525/504; 523/415
[58] Field of Search .................. 528/45; 525/504

[56] References Cited

U.S. PATENT DOCUMENTS

| 3,326,894 | 6/1967 | Enders et al. | 528/107 |
| 3,336,247 | 8/1967 | Williams | 528/107 |
| 3,922,253 | 11/1975 | Jerabek et al. | 528/45 |
| 4,101,486 | 6/1978 | Bosso et al. | 528/45 |

*Primary Examiner*—John Kight
*Assistant Examiner*—Frederick Krass
*Attorney, Agent, or Firm*—A. W. Breiner

[57] ABSTRACT

Cationic paint binders, water-dilutable upon protonation, which crosslink internally at elevated temperatures are obtained through reaction of beta-hydroxyamines of the general formula-wherein $R_1$ is a (cyclo)alkyl radical and/or a hydroxyalkyl radical and/or a tertiary amino(cyclo)alkyl radical, or optionally a radical resulting from the reaction of glycidyl groups with a primary-secondary amine or a diprimary amine and $R_2$ is an aliphatic and/or aromatic radical of a polyepoxy compound, with partially blocked polyisocyanates and subsequent reaction with formaldehyde. In addition to having excellent film properties, the products show particularly favorable characteristics for processing, since they do not exhibit the thixotropy effects normal with such systems. The products are particularly suited for the formulation of cathodically depositable electrodeposition paints.

11 Claims, No Drawings

1

SELF-CROSSLINKING CATIONIC PAINT BINDERS FROM AMINE MODIFIED EPOXY RESINS REACTED WITH (1) PARTIALLY BLOCKED ISOCYANATE AND (2) FORMALDEHYDE

FIELD OF INVENTION AND BACKGROUND

This invention relates to cationic paint binders. More particularly, the invention relates to cationic paint binders based on modified epoxy resins which include urea groups which are water-dilutable upon protonation and which will internally crosslink at elevated temperatures.

Commonly assigned U.S. application Ser. No. 833,163 filed Feb. 27, 1986 discloses cationic compounds carrying urea groups obtained through reaction of beta-hydroxyamines, isocyanate compounds, and formaldehyde which function as substantially water-insoluble crosslinking components for cationic paint binders.

It has now been found that certain of the cationic compounds disclosed in U.S. application Ser. No. 833,163 can be modified to provide water-dilutable binders which have enhanced characteristics over commonly employed binders especially when used for cathodic electrodeposition. The cationic compounds useful as crosslinking components in cationic paint binders disclosed in U.S. application Ser. No. 833,163, subject to modification according to this invention, are the compounds obtained from beta-hydroxyamines having the formula—

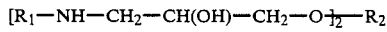

$$[R_1-NH-CH_2-CH(OH)-CH_2-O]_{\overline{2}}-R_2$$

wherein $R_1$ is an alkyl radical or a hydroxyalkyl radical and $R_2$ is an aliphatic and/or aromatic radical of a di- or polyglycidyl compound reacted with partially blocked polyisocyanates, and the subsequent reaction with formaldehyde with the separation of water.

SUMMARY OF INVENTION

The present invention is concerned with cationic paint binders, and a process for producing such binders, water-dilutable upon protonation which will internally crosslink at elevated temperature, based on modified epoxy resins carrying urea groups. These binders are the reaction products of a beta-hydroxyamine of the general formula—

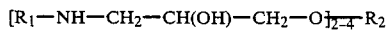

$$[R_1-NH-CH_2-CH(OH)-CH_2-O]_{\overline{2}}-R_2$$

wherein $R_1$ is a (cyclo)alkyl radical and/or a hydroxyalkyl radical and optionally a radical resulting from the reaction of glycidyl groups with a primary-secondary or a diprimary amine and/or a tertiary amino(cyclo)alkyl radical and $R_2$ is an aliphatic and/or aromatic radical of a polyepoxy compound, with partially blocked polyisocyanates in a ratio such that per secondary amino group one free isocyanate group is used. The reaction is preferably carried out at from about 30 to 50° C. The reaction product thus obtained is then reacted preferably at 80 to 130° C., optionally in the presence of a basic catalyst, with from 0.5 to 1.0 mole of formaldehyde to provide binder products having an amine value of at least 30 mg KOH/g derived from tertiary amino groups of the tertiary amino(cyclo)alkyl radial and/or from the blocking agents of the isocyanate compounds carrying tertiary amino groups.

The invention further relates to the use of the binders in the formulation of water-dilutable paints, particularly for use in cathodically depositable electrodeposition paints. Paints based on the binders of the present invention do not show the thixotropy normal with epoxy resins carrying urea groups, which fact substantially alleviates processing of the products. Furthermore, paints based on the binders of the invention can be stoved at stoving temperatures reduced down to 150° C., representing a substantial advantage in comparison to the commonly employed electrodeposition paints. Because of the urea groups, the products exhibit excellent adhesion to the substrates as well as to a following coat.

The beta-hydroxyamines of the general formula—

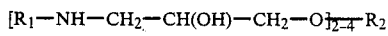

$$[R_1-NH-CH_2-CH(OH)-CH_2-O]_{\overline{2}}-R_2$$

wherein $R_1$ is a (cyclo)alkyl radical and/or a hydroxyalkyl radical and/or a tertiary amino(cyclo)alkyl radical and $R_2$ is an aliphatic and/or aromatic radical of a di- or polyglycidylether, are obtained through reaction of the glycidylethers with amines carrying a primary amino group. The preferred digylcidylethers are the known epoxy resins based on diphenylol alkanes. Optionally, the chain of the epoxy resins can be extended through epoxy-reactive compounds such as dicarboxylic acids, amines, diols, diphenols and the like; or with more complex compounds such as the oligoesters, oligoethers, or oligoamides. Other di-epoxy compounds may be obtained from dialcohols, in particular from polyalkylene glycols or from dicarboxylic acids. Suitable polyglycidyl ethers are also obtained from phenol novolaks. Other compounds of this type are epoxidized butadiene polymers, epoxidized oils, and the like.

Preferred amines with primary amino groups which are suitable according to the invention are the N,N-dialkylalkylene diamines. The tertiary aminoalkyl radical of these compounds provide the basic groups necessary for the protonation and, thus, water-dilutability. Examples of such compounds are N, N-dimethylethylene diamine (N,N-dimethylaminoethylamine) and its homologues or 1-diethylamino-4-amino-pentane, dimethylaminoneopentanamine, 4-dimethylamino-4'-aminodicyclohexylmethane, and the like. In the same way, alone or in admixture with such primary-tertiary diamines, primary(cyclo)aliphatic monoamines can be used, such as ethylamine and its homologues, or cyclohexylamine, and the like; or primary hydroxyamines such as monoethanolamine and its homologues. Optionally, di-primary monoamines can be used. However, if used, their high functionality must be considered. When using primary-secondary diamines, such as aminoethylpiperazine or aminoethylethanolamine, the quantity of the monoisocyanates has to be adjusted stoichiometrically to the number of secondary amino groups.

In the preparation of the cationic binders of the invention, the beta-hydroxyamines are reacted with partially blocked polyisocyanates. Since the isocyanate group preferentially reacts with the amino group, a urea group is formed which also influences the properties of the binder. Preferably, the partially blocked polyisocyanates have one free isocyanate group. The preferred diisocyanate compounds are those with different reactivity of the NCO-groups, such as isophorone diisocyanate or 2,4-toluylene diisocyanate, or 2,4-toluylene diisocyanate as a blend with 2,6-toluylene diisocyanate. The blocking agents are those commonly used with the condition that the blocking is stable in an aqueous medium. The preferred blocking agents are the monoalcohols. Optionally, protonable basic groups may be introduced with the blocking agent, for example through the use of alkanol amines such as diethylethanolamine.

In a final step, the urea group containing intermediates are reacted with formaldehyde. In this reaction one mole of water is separated per mole of formaldehyde. Due to the fact that the viscosity is reduced in this reaction, it is theorized that the functional groups are blocked which are responsible for the formation of hydrogen bridges.

The beta-hydroxyamines of the general formula are prepared through reaction of the glycidyl compound with the amine at 30° to 60° C., preferably in the presence of aprotic solvents such as toluol, xylol, or diethyleneglycol dimethylether. One primary amino group is reacted with one epoxy group. The reaction is complete when no free epoxy groups can be traced.

The reaction of the beta-hydroxyamines with the partially blocked isocyanate is carried out at 30° to 50° C., the isocyanate being added while cooling. The reaction product resulting after the complete reaction of the isocyanate groups is highly thixotropic.

The further condensation with formaldehyde is carried out at 80° to 130° C. The resulting reaction water is removed azeotropically with the aid of a solvent such as toluol, or a special benzine having a boiling range of from about 80° to 120° C. In this reaction a pronounced reduction of the viscosity occurs. After vacuum-stripping the solvent, the product is dissolved with a water-tolerant solvent such as propyleneglycolmonomethylether or diethyleneglycoldimethylether. The formaldehyde is preferably used as paraformaldehyde which is form 90 to 100% $CH_2O$. The reaction can optionally be carried out in the presence of a catalyst such as triethylamine.

The weight ratios of the components are chosen in order that per NH-group of the beta-hydroxyamine one NCO-equivalent and 0.5 to 1.0 mole of formaldehyde are used. The basic groups necessary for protonation must correspond to an amine value of at least 30 mg KOH/g.

The formulation and preparation of paints containing the claimed binders for the various methods of application are known to one skilled in the art. One example of a paint formulation for cathodically depositable paints is set forth in the evaluation of the examples of the invention. The paints may be cured at temperatures of from 150° C. upwards. Optionally, additional crosslinking agents known in the art can be coemployed.

The following examples illustrate the invention without limiting its scope. Parts and percentages are by weight unless otherwise stated. The following abbreviations are used in the examples:

EPH I ... Diepoxy resin based on bisphenol A and epichlorohydrin having an epoxy equivalent weight of about 190

EPH II ... Diepoxy resin based on bisphenol A and epichlorohydrin having an epoxy equivalent weight of about 475

EPH III ... Epoxidized phenol novolak having an epoxy equivalent weight of about 180, with an average of 3.6 phenol nuclei per molecule DEAPA ... N,N-diethylpropylenediamine
HMDA ... 1,6-hexamethylenediamine
EHA ... 2-ethylhexylamine
HA ... n-hexylamine
MIPA ... monoisopropanolamine
AEP ... aminoethylpiperazine
TDI ... toluylene diisocyanate (available 80/20 isomer blend)
IPDI ... isophorone diisocyanate
MIC 1 ... TDI semi-blocked with 2-ethylhexanol
MIC 2 ... TDI semi-blocked with an N-hydroxyoxazolidine, 70% toluol (the N-hydroxyoxazolidine was prepared in known manner from 73 parts monoisopropanol, 268 parts octadeceneoxide, and 33 parts paraformaldehyde, 91%)
MIC 3 ... IPDI semi-blocked with ethyleneglycolmonoethylether
MIC 4 ... reaction product of 1 mole IPDI and 1 mole diethanolamine
FA ... paraformaldehyde, 91% $CH_2O$
DGDM ... diethyleneglycoldimethylether
MEK ... methylethyletone
Val ... Equivalent weight in grams for the designated functional group and, accordingly, is equivalent to groups

EXAMPLES 1 TO 5

A 60% solution of the epoxy resin is charged to a suitable reaction vessel and the amine is added after the temperature is raised to 30° C. The temperature should not surpass 60° C. The temperature is held until all epoxy groups are consumed. Then, at 30° C. to a maximum of 50° C., the semi-blocked diisocyanate is added in portions while cooling. Normally, the reaction is finished at the end of the addition with the product having an NCO-value equal to zero. After heating the reaction product to 70° C., the paraformaldehyde is added and the temperature is raised until a continuous distillation starts using toluol as an entraining agent, with the separation of water. The reaction is completed when the calculated quantity of water (1 mole water per mole of $CH_2O$, 100%) has separated. After vacuum-stripping the entraining agent, the batch is dissolved with the designated solvent.

Quantities and types of the starting materials are listed in Table 1. All quantities refer to 100% resin solids.

TABLE 1

| Example | EPH Parts | (Val) | Amine Parts | ($NH_2$—Val) | MIC Parts | (Moles) | FA Parts | (Moles) |
|---|---|---|---|---|---|---|---|---|
| 1 | 950 EPH II | (2) | 195 DEAPA | (1.5) | 608 MIC 1 | (2) | 66 | (2) |
|   |   |   | 65 EHA | (0.5) |   |   |   |   |
| 2 | 190 EPH I | (1) | 117 DEAPA | (0.9) | 753 MIC 2 | (1) | 33 | (1) |
| 3 | 950 EPH II | (2) | 221 DEAPA | (1.7) | 624 MIC 3 | (2) | 66 | (2) |
|   |   |   | 17 HMDA | (0.3) |   |   |   |   |
| 4 | 180 EPH III | (1) | 101 HA | (1.0) | 339 MIC 4 | (2) | 33 | (1) |
| 5 | 190 EPH I | (1) | 73 MIPA | (1.0) | 912 MIC 1 | (3) | 66 | (2) |

TABLE 1-continued

| Example | EPH Parts | (Val) | Amine Parts | (NH₂—Val) | MIC Parts | (Moles) | FA Parts | (Moles) |
|---|---|---|---|---|---|---|---|---|
|  | 475 EPH II | (1) | 129 AEP | (1.0) |  |  |  |  |

Evaulation Of The Paint Binders Of The Invention

1. Evaluation As A Clear Varnish

The binder solutions according to the examples are partially neutralized with the quantity of formic acid listed in Table 2 (millimoles per 100 g resin solids) and, after addition of the designated catalyst, are diluted with deionized water to a solids content of 15%. The clear varnish is poured onto a glass plate, allowed to flash off for 10 minutes at 40° C. and cured for 15 minutes at the designated temperature. The temperature is chosen in order that the cured films with a film thickness of 20±2 μm are resistant to 200 double rubs with MEK. The listed quantity of catalyst is calculated as metal based on 100% resin solids.

TABLE 2

Clear Varnish Tests

| Example | Catalyst | Neutralization | Stoving Temperature °C. |
|---|---|---|---|
| 1 | 0.6 Sn | 30 | 155 |
| 2 | 0.2 Co | 40 | 160 |
| 3 | 0.8 Sn | 45 | 150 |
| 4 | 0.5 Pb | 60 | 155 |
| 5 | 0.8 Sn | 50 | 160 |

Sn = dibutyltindilaurate
Co = cobalt octoate
Pb = lead octoate

2. Evaluation As Pigmented Paints

Of the binders listed in Table 1, 75 parts at 100% resin solids are mixed with 25 parts of a pigmented paste where 83 parts contain 40 parts of pigments. The mixture is neutralized, mixed with the designated catalyst and diluted with deionized water to 18% solids content, and deposited electrophoretically in known manner on zinc-phosphated steel panels. The films cured at temperatures designated in Table 3 have a film thickness of 23±2 μm, a salt spray resistance according to ASTM-B 117-64 of more than 100 hours (peel-off at the cross incision of less than 2 mm), and a resistance to 200 double rubs with MEK.

TABLE 3

| Example | 1 | 2 | 3 | 4 | 5 |
|---|---|---|---|---|---|
| Neutralization mMoles HCOOH/ 100 g Resin Solids | 30 | 40 | 45 | 60 | 50 |
| Catalyst % Metal | 0.8 Sn | 0.3 Co | 0.8 Sn | 0.5 Pb | 0.8 Sn |
| Stoving Temperature °C. 25 minutes | 160 | 160 | 150 | 155 | 160 |

The pigmented paste consists of 100 parts mill base resin (100% solids), 1 part carbon black, 12 parts basic lead silicate, and 147 parts titanium dioxide. The mill base resin is prepared as follows: 500 parts of an epoxy resin based on bisphenol A and epicholorhydrin (epoxy equivalent weight about 500) are dissolved in 214 parts propylenglycolmonomethylether and, at 110° C., reacted with 83 parts of a semiester of phthalic acid anhydride and 2-ethylhexanol in the presence of 0.5 g triethylamine as catalyst to an acid value of below 3 mg KOH/g. Then 120 parts of an NH-functional oxazolidine of aminoethylethanolamine, 2-ethylhexylacrylate and formaldehyde, and 26 parts diethylaminopropylamine are added and the batch is reacted at 80° C. to an epoxy value of practically zero. The batch is diluted with 200 parts propyleneglycolmonomethylether and partially neutralized with 97 parts 3-Normal formic acid. The resulting solids content is 58.8%.

As will be apparent to one skilled in the art, various modifications can be made within the scope of the aforesaid description. Such modifications being within the ability of one skilled in the art form a part of the present invention and are embraced by the appended claims.

It is claimed:

1. Process for producing cationic paint binders which are water-dilutable upon protonation and which are selfcrosslinking at elevated temperature based on modified epoxy resins carrying urea groups comprising the steps of reacting
    (a) the epoxy groups of a polyepoxy compound with an equivalent amount of
    (b) primary amine groups of an amino compound selected from the group consisting of primary alkylamines, primary hydroxyalkylamines, primary-secondary diamines, and primary-tertiary amines and reacting the obtained beta-hydroxyamine at a temperature of from about 30° C. to about 50° C. with
    (c) a partially blocked polyisocyanate having one free isocyanate group at a ratio selected in order that per secondary amine group one free isocyanate group is used, and reacting the urea groups of the reaction product at a temperature of from about 80° C. to about 130° C. with
    (d) from about 0.5 to 1.0 mole of formaldehyde per urea group with the provision that in the final product the protonable amino groups correspond to an amine value of at least 30 mg KOH/g, being derived from primary-tertiary alkylene diamines used in (b) and/or from tertiary amine group containing blocking agents used in (c).

2. The process according to claim 1 wherein the polyepoxy compound is a diepoxide compound.

3. The process according to claim 2 wherein the diepoxy compound of (a) is modified through chain prolongation with a polyfunctional compound.

4. The process according to claim 1 wherein the amino compound of (b) is a primary-tertiary amine, and said amine value is derived from the tertiary amino groups.

5. The process according to claim 1 wherein the partially blocked polyisocyanate is a diisocyanate and includes tertiary amino groups and said amino value is derived from the tertiary amino groups of the partially blocked diisocyanate.

6. Cationic paint binders which are water-dilutable upon protonation and which are self-crosslinking at elevated temperature comprising the reaction products of
    (a) the epoxy groups of a polyepoxy compound with an equivalent amount of (b) primary amine groups of an amino compound selected from the group consisting of primary alkylamines, primary hydroxyalkylamines, primary-secondary diamines, and primary-tertiary amines, and thereafter reacting the beta-hydroxyamine obtained at a temperature of from about 30° C. to about 50° C. with (c) a partially blocked polyisocyanate having one free isocyanate group at a ratio selected in order that per secondary amine group one free isocyanate group is used, and thereafter reacting the urea groups of said reaction product at a temperature of from about 80° C. to about 130° C. with (d) from about 0.5 to 1.0 mole of formaldehyde per urea group, the reactants being selected so that in the final product protonable amino groups are present corresponding to an amine value of at least 30 mg KOH/g which are derived from primary-tertiary alkylene diamines used in (b) and/or from tertiary amine group containing blocking agents used in (c).

7. The binders according to claim 6 wherein the polyepoxy compound of (a) is a diepoxy compound modified through chain prolongation with a polyfunctional compound.

8. The binders according to claim 6 wherein the amino compound of (b) is a primary-tertiary amine, and said amine value is derived from such tertiary amino groups.

9. The binders according to claim 6 wherein the partially blocked polyisocyanate is a diisocyanate and includes tertiary amino groups and said amine value is derived from the tertiary amino groups of said partially blocked diisocyanate.

10. A water-dilutable paint comprising the binder of claim 6.

11. A water-dilutable, cathodically depositable electrodeposition paint comprising the binder of claim 6.

* * * * *